United States Patent [19]

Simmons

[11] 4,086,849
[45] May 2, 1978

[54] MOBILE BROILER APPARATUS

[76] Inventor: James A. Simmons, 5225 St. Joseph Ave., Stevensville, Mich. 49127

[21] Appl. No.: 787,624

[22] Filed: Apr. 14, 1977

[51] Int. Cl.² .............................................. A47J 37/07
[52] U.S. Cl. ...................................... 99/357; 99/339; 99/340; 99/421 H; 126/276
[58] Field of Search ................. 99/419, 421 R, 421 H, 99/421 HH, 422, 425, 339, 340, 357; 126/25 R, 25 A, 268, 276

[56] References Cited

U.S. PATENT DOCUMENTS

| | | | |
|---|---|---|---|
| 2,838,991 | 6/1958 | Kleinmann | 99/421 H |
| 3,025,782 | 3/1962 | Stall | 99/339 |
| 3,208,808 | 9/1965 | Kinapp | 99/419 UX |
| 3,683,791 | 8/1972 | Rost | 99/340 |
| 3,861,288 | 1/1975 | Cluff | 99/339 |

Primary Examiner—Edward J. McCarthy
Attorney, Agent, or Firm—Blanchard, Flynn, Thiel, Boutell & Tanis

[57] ABSTRACT

A mobile broiler apparatus including a trailer frame having road engaging wheels thereon and a hitch for connection to a vehicle. The trailer frame has an open top chamber having sidewalls and a bottom wall mounted thereon with support brackets being secured to the inside walls of the chamber adjacent the upper edges thereof. Food supporting devices are mounted on the support brackets in spaced relation from the bottom wall and vertically spaced above a controllable heat generator positioned in the spacing between the food supporting devices and the bottom wall for cooking food supported on the food supporting device. A guide mechanism is provided on the sidewalls of the chamber which extend in a direction parallel to the longitudinal axis of the trailer frame. A table device having guide mechanisms thereon is cooperably engaged with the guide mechanism on the chamber for facilitating a relative movement of the table with respect to the chamber between a first position closing the open top of the chamber and a second position located along side the chamber, preferably out over the top of the hitch for the trailer frame so as to prevent inadvertent contact therewith by persons standing around the mobile broiler apparatus.

11 Claims, 8 Drawing Figures

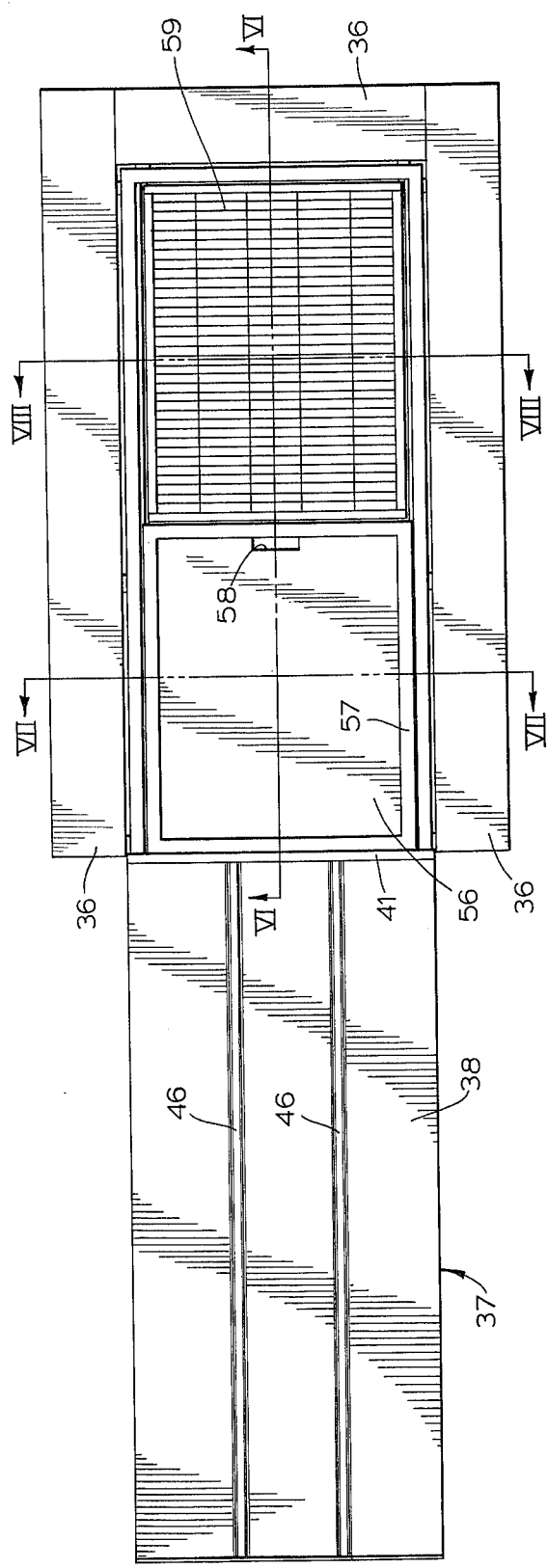
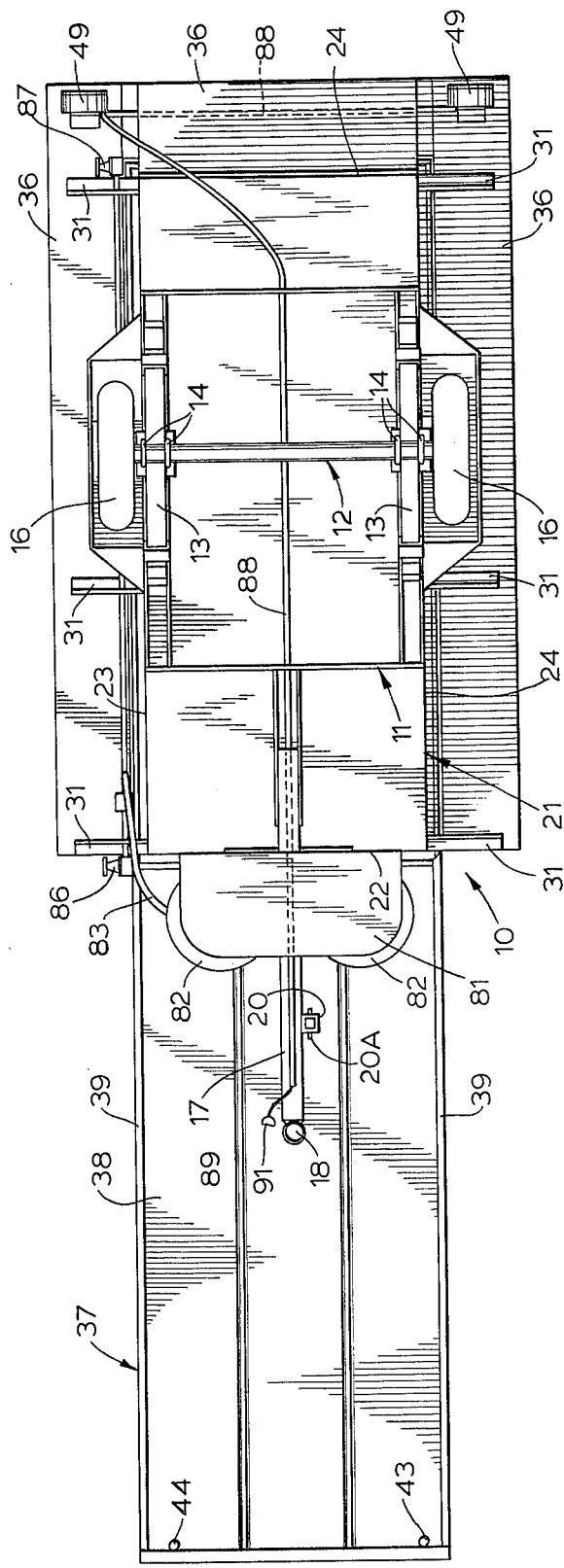

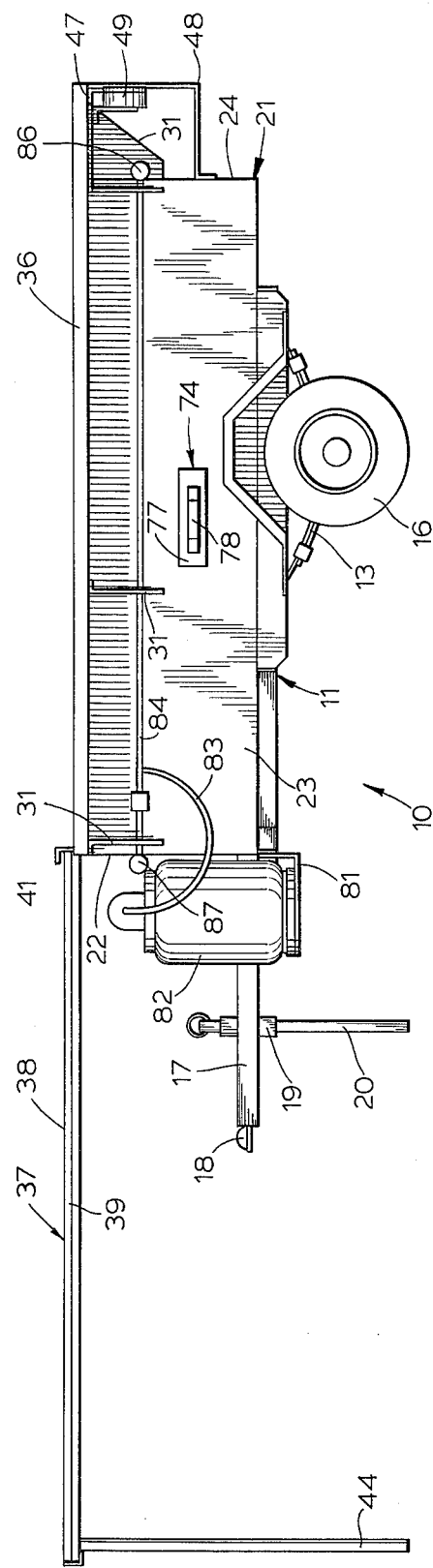
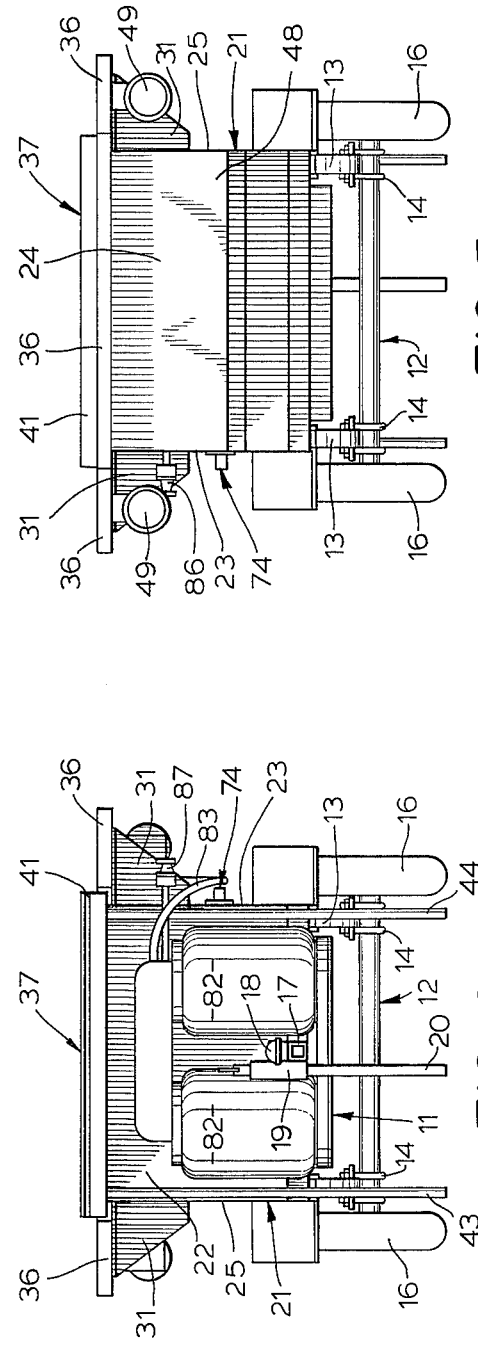

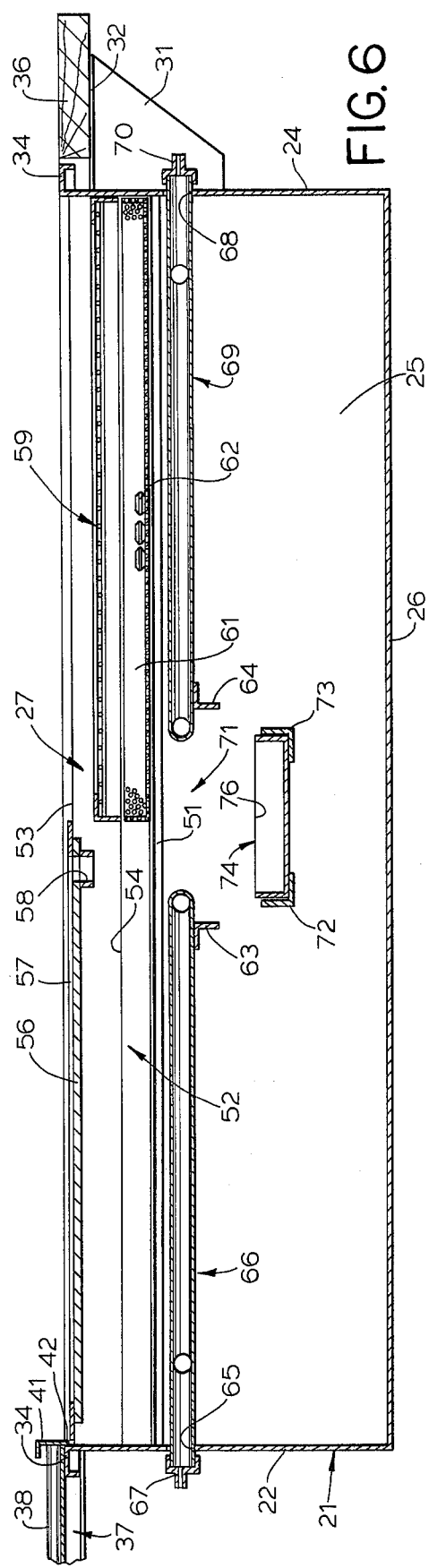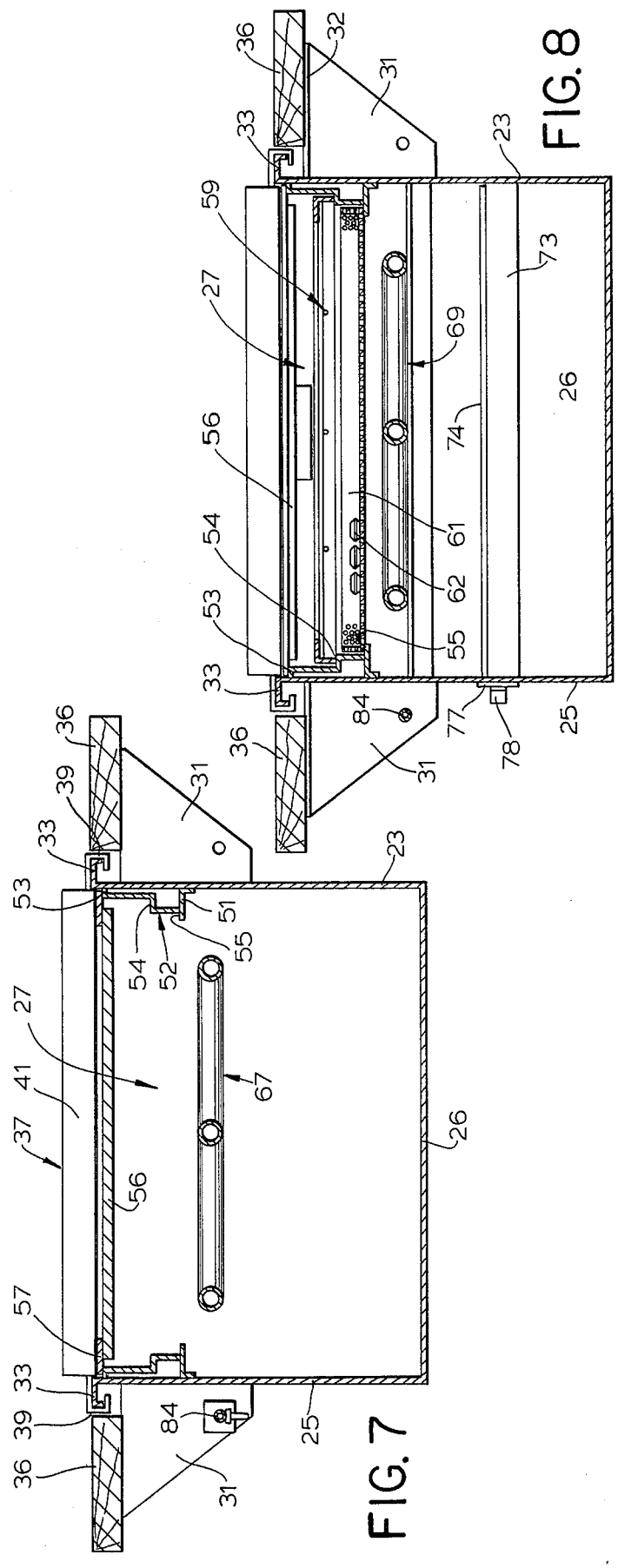

MOBILE BROILER APPARATUS

FIELD OF THE INVENTION

This invention relates to a mobile broiler apparatus and, more particularly, relates to a mobile broiler mounted on a trailer frame having road engaging wheels and a hitch for connection to a vehicle and, in addition, a table construction forming an integral part therewith and which is movable between a retracted position for storage and an extended position of use thereof.

BACKGROUND OF THE INVENTION

Outdoor cooking apparatus of various kinds are available in the market place. However, broiler units for use in catering large outdoor cookouts is not available and the subject matter of my invention discussed below relates to just such an apparatus for the aforesaid use. While the mobile broiler apparatus described hereinbelow arose out of a need for a unit for rental purposes or for use in providing catering services for large cookouts, it is to be recognized that other uses could be possible and the following disclosure is not to be limiting.

Accordingly, it is an object of this invention to provide a mobile broiler apparatus mounted on a trailer frame and having road engaging wheels and a hitch for attachment to a vehicle.

It is a further object of this invention to provide a mobile broiler apparatus, as aforesaid, wherein a table member is an integral part of the mobile broiler apparatus and is movable between a retracted and an extended position, the table when in the extended position providing a serving table upon which food can be placed and distributed.

It is a further object of this invention to provide a mobile broiler apparatus, as aforesaid, which will comply with Environmental Protection Agency regulations and other health agency regulations.

It is a further object of this invention to provide a mobile broiler apparatus, as aforesaid, which is easy to clean and maintain in proper operating condition.

SUMMARY OF THE INVENTION

In general, the objects and purposes of the invention are met by providing a mobile broiler apparatus having a trailer frame means including road engaging wheel means and hitch means for connection to a vehicle. An open top chamber having sidewalls and a bottom wall is mounted on the trailer frame means. A support is provided in the chamber adjacent the upper edge for holding and supporting food supporting means mounted thereon and in spaced relation from the bottom of the chamber. Controllable heat generating means are positioned in the spacing between the food supporting means and the bottom wall for cooking food supported on the food supporting means. First guide means are mounted on at least one of the sidewalls adjacent the upper edge of the chamber and extend along the entire side of the open top chamber. Table means and second guide means thereon cooperably engage the first guide means for facilitating a relative movement of the table means with respect to the chamber means between a first position closing the open top of the chamber and a second position located along a side of the chamber. The table means when in the first position overlaps the food supporting means to permit transportation to distant locations and when in the second position functioning as a support surface to facilitate a distribution of food placed thereon.

BRIEF DESCRIPTION OF THE DRAWINGS

Further objects and purposes of this invention will be apparent to persons acquainted with apparatus of this general type upon reading the following specification and inspecting the accompanying drawings, in which:

FIG. 1 is a top view of the mobile broiler apparatus embodying my invention;

FIG. 2 is a bottom view thereof;

FIG. 3 is a right side view thereof;

FIG. 4 is a front view thereof;

FIG. 5 is a rear view thereof;

FIG. 6 is a sectional view taken along the line VI—VI in FIG. 1;

FIG. 7 is a sectional view taken along the line VII—VII of FIG. 1; and

FIG. 8 is a sectional view taken along the line VIII—VIII of FIG. 1.

DETAILED DESCRIPTION

A mobile broiler apparatus 10 embodying my invention is illustrated in the drawings and includes a trailer frame 11 having an axle secured through conventional leafspring construction 13 and U-bolts 14 to the trailer frame 11. Wheels 16 are rotatably secured to the opposite ends of the axle 12 in the usual manner. A trailer tongue 17 is connected to the trailer frame 11 and has a hitch construction 18 on the free end thereof. A tubular bracket 19 is secured to the trailer tongue 17 and the axis of the opening therethrough extends vertically. A post 20 is received in the tubular bracket 19 and is maintained in a fixed position by a lock pin 20A received in aligned holes provided in both the tubular bracket 19 and the post 20 to fixedly position the post 20 relative to the trailer tongue 17. The purpose of the post 20 and its relative positioning with respect to the trailer tongue 17 is to permit an adjustment of the trailer frame 11 so that it is generally horizontal when in the parked position and when the hitch construction 18 is disconnected from a vehicle.

An open top box 21 having four sidewalls 22, 23, 24 and 25 and a bottom wall 26 is mounted on the trailer frame 11 and secured thereto by any conventional type of construction, as by welding. The open top box 21 defines a chamber 27. A plurality of brackets 31 are secured to the outer periphery of three sidewalls 23, 24 and 25 and extend outwardly therefrom. The brackets 31 each have a horizontal flange 32 thereon. The upper edges of the sidewalls 23 and 25 each have a curled over rim construction 33. The upper edge of the sidewalls 22 and 24 have a similar type of curled over rim construction 34. The rim constructions 33 and 34 are elevated above the horizontal flanges 32. A wooden support surface 36 is mounted on and secured to the horizontal flanges 32 and the thickness of the support surface 36 is generally equal to the spacing between the horizontal flange and the upper surface of the rim constructions 33 and 34. The support surface 36, while being made of wood in this particular embodiment, can be made of any type of material so long as the material is generally resistant to the transmission of heat.

A table device 37 includes an elongated sheet of material 38, such as stainless steel, having curled edges 39 along the opposite longitudinal edges thereof. The curled edges 39 are adapted to partially encircle and cooperate with the curled rim constructions 33 adjacent the upper edges of the sidewalls 23 and 25 of the chamber 27. In other words, the curled rim constructions 33 define a track for receiving the curled edges 39 on the table 37. The table 37 has a length generally equal to the length of the opening into the chamber 27 and can be slid along the rim constructions 33 to positions closing the entire top of the chamber 27 and positions extended out over the top of the trailer tongue 17 as illustrated in FIGS. 1 to 3. A flange 41 is secured to the right end of the table 37 (FIGS. 1 to 3) and has a tab part 42 extending into the path of the curled over rim 34 of the sidewall 22 to limit movement, here movement in a frontward direction out over the top of the trailer hitch, and an inadvertent removal of the table during the aforesaid movement. The usual sockets are provided on the underside of the table 37 at the end thereof remote from the flange 41 for receiving table legs 43 and 44. These table legs 43 and 44 are removable so that when the table 37 is slid to a position closing the top of the chamber 27, the legs 43 and 44 may be stored inside the chamber 27, for example, during transportation to distant locations. The sheet metal 38 of the table 37 is rigidified by, in this particular embodiment, a pair of longitudinally extending ribs 46 provided in the sheet metal 38.

A plurality of brackets, here L-shaped brackets 47 are secured to the underside of the support surface 36 located at the rear of the mobile broiler apparatus 10. A generally L-shaped protective shield 48 is secured to the rear sidewall 24 and one leg of the bracket 47. The purpose of the protective shield will become apparent hereinbelow. A pair of taillights 49 are secured to the underside of the support surfaces 36 and can, if desired, be secured directly to the sidewalls of the box 21.

Referring now to FIGS. 6 to 8, a pair of elongated shelf members 51 are secured to the internal surfaces of the sidewalls 23 and 25. The shelf members 51 are spaced below the rim constructions 33. A stepped support member 52 is secured to the internal position of each of the sidewalls 23 and 25 and extend between the upper surface of the shelf members 51 and terminate at a position just below the rim constructions 33. The upper portion of the support member 52 defines a first step 53. An intermediate step 54 is provided in the support member 52 and the lower end of the support member 52 is spaced from the innermost edge of the shelf member 51 to define a third step 55.

A flat planar cooking surface, oftentimes referred to as a griddle 56, is mounted on and supported by the uppermost step 53. The griddle 56 has a raised edge 57 therearound with an opening 58 provided along one edge thereof to facilitate the removal of collected cooking remnants therethrough. The griddle 56 has a size which occupies approximately one half of the open top portion into the chamber 27. The remainder of the open top part of the chamber 27 is occupied by a grid 59 which is mounted on and supported by the step 54. The grid 59 can be of any conventional type of construction such as is shown in the drawings and occupies the remainder of the open top part of the chamber 27. A basketlike member 64 is mounted on and supported by the step 55. The basket 61 has a perforated type construction to facilitate the passage of heat therethrough toward the grid 59. A plurality of stones or devices for collecting grease and the like from food that is placed on the grid are provided in the basket 62 in a conventional manner.

A pair of brackets, here L-shaped brackets 63 and 64 are connected to and extend between the sidewalls 23 and 25 of the box 21. A hole 65 is provided in the sidewall 67 at an elevation approximately equal to the elevation of the bracket 63. A burner unit 66 is received in the hole 65 and is supported in the sidewall 22 and on the upper surface of the bracket 63. The burner unit 66 is of a conventional type capable of distributing a combustible gas to holes provided therein to supply a uniform heat to the undersurface of the griddle 56. An inlet connector 67 is connected to the burner unit 66 on the portion of the burner unit which is exposed to the outside of the chamber 27.

Similarly, a hole 68 is provided in the sidewall 24 at an elevation equalling the elevation of the bracket 64. A burner unit 69 is mounted so that it is received in the hole 68 and is supported by the sidewall 24 at one end and by the bracket 64 at the other end. The burner unit 69 is of a conventional construction having a plurality of holes therein permitting the passage of combustible gas therethrough to provide a uniform heat to the undersurface of the basket 61 and grid 59. An inlet connector 70 is provided on the portion of the burner unit which is exposed to the outside of the chamber 27.

A spacing 71 is provided between the innermost ends of the burner units 66 and 69. A pair of L-shaped brackets 72 and 73 are connected to and extend between the sidewalls 23 and 25 of the box 21. The brackets 72 and 73 are spaced immediately below the brackets 63 and 64. A drawer 74 which is approximately equal in width to the spacing 71 is slidably mounted on the brackets 72 and 73 and is adapted to pass out through an opening 76 provided in the sidewall 25. A front panel 77 is secured to the front side of the drawer 74 and is exposed to the exterior of the chamber 27. A handle 78 is secured to the front panel 77 in a conventional manner. The drawer 74 is located below the opening 58 in the griddle 56 so that the cooking remnants pushed through the opening 58 will be collected in the drawer 74.

A support bracket 81 is secured to the box 21 adjacent the front end thereof as best illustrated in FIG. 3. The support bracket 81 is adapted to support a pair of tanks capable of holding a quantity of propane gas or other gaseous combustible type material. A conduit 83 extends from the usual outlets from the tanks 82 to a distributor pipe 84 mounted in openings provided in the bracket 31 secured to the sidewall 23 of the box 21. The conduit 83 is connected to the distributor pipe 84 intermediate the ends thereof so that valves 86 and 87 connected in circuit with the distributor pipe 84 at the ends thereof can provide control of the gas flow to the two burner units 66 and 69. In this particular embodiment, piping is provided between the left end of the conduit 84 and valve 87 to the inlet connector 67 to the burner unit 66. As a result, the control valve 87 controls the quantity of gas supplied to the burner unit 66. Similarly, a piping is connected between the right end of the distributor pipe 84 in FIG. 3 and control valve 86 to the inlet connector 70 to the burner unit 69. As a result, the control valve 86 controls the quantity of gas supplied to the burner unit 69.

The taillights 49 are supplied with electrical power from the vehicle through a wire 89 mounted inside a conduit 88 secured to the underside of the trailer frame 11 as illustrated in FIG. 2. The free end of the wire 89 has a plug 91 mounted thereon.

OPERATION

Although the operation and use of the device embodying the invention has been indicated somewhat above, said operation will be described in detail hereinbelow for convenience.

When a person or organization decides to have an outdoor party with many invited guests, that person or organization usually does not have sufficient time to construct the apparatus for cooking the food for the many invited guests. Such person may be the manager of a restaurant, motel, hotel, golf course or the like and it is desired to rent the necessary equipment or utilize the services of a professional organization capable of providing and cooking the food for the many invited guests. In the past, and when it is desired to cook the food over an open fire, crude cooking devices, such as cement blocks with grids thereon or oil drums which have been cut in half and have grids thereon have heretofore been utilized to provide a fire chamber for holding the fire. However, this type of construction makes it necessary for the particular person that is having the party to clean the apparatus following the event. The disclosure contained herein relates to a device which makes it possible to rent such equipment or for a professional organization to cater an event and bring the cooking equipment to the site of the festivity. The mobile broiler apparatus may be connected to a conventional trailer hitch on a vehicle and drawn to the site of the festivity. Thereafter, the trailer hitch may be disconnected from the vehicle and the post 20 adjusted to the proper elevation so that the cooking surface provided by either a pair of griddles 56 or a pair of grids 59 or by the structure illustrated in FIG. 1, for example, is level. Thereafter, the table device 37 may be extended by sliding same along the rim constructions 33 to the extended position illustrated in FIGS. 1 to 3. The legs 43 and 44 may then be inserted in the appropriate sockets so that the outer free end of the table device 37 will be properly supported. An adjustment of the post 20 relative to the trailer tongue 17 will facilitate a maintaining of the table 37 and cooking surfaces close to a horizontal alignment.

Thereafter, the valves (not shown) on the tanks 82 may be turned on and the valves 86 and 87 may be selectively turned on so that the gas coming from the openings in the respective burner units 66 and 69 may be ignited to provide heat for cooking purposes. The control valves 86 and 87 may thereafter be selectively controlled to provide the proper amount of heat to the undersurface of the cooking surfaces.

If the griddle 56 is utilized, any cooking remnants contained thereon may be pushed through the opening 58 provided therein and collected in the drawer 74.

Following a cooking of the food, the cooked food may be placed on the table 37 and the people desiring such food can line up along the side edges of the table 37 so that the food placed thereon can be distributed to the people. The support surfaces 36 located along the side edges of the chamber 27 provide a form of protection to prevent the inadvertent contact of the body with the hot sidewalls of the chamber 37. Similarly, such support surfaces 37 can also be utilized for the purposes of placement of food thereon for distribution to the people.

At the completion of the cooking operation, the mobile broiler apparatus can be quickly disassembled by sliding the table 37 over the open top of the chamber 37, after the gas supply to the burner units 66 and 69 have been shut off. The legs 43 and 44 can be properly stowed and the mobile broiler apparatus transported back to the original location for clean-up purposes. As a result, the particular person and/or organization which had the festivity does not need to be concerned with the clean-up procedure concerning the cooking apparatus.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A mobile broiler apparatus, comprising:
   trailer frame means including road engaging wheel means and hitch means for connection to a vehicle;
   an open top chamber having sidewalls and a bottom wall mounted on said trailer frame means, said chamber including support means adjacent the upper edge of said open top to said chamber and said sidewalls;
   food supporting means mounted on aid support means in spaced relation from said bottom wall of said chamber;
   controllable heat generating means positioned in the spacing between said food supporting means and said bottom wall for cooking food supported on said food supporting means;
   first guide means mounted on at least one of said sidewalls adjacent the upper edge thereof and extending along the entire side of said open top chamber;
   table means and second guide means thereon cooperably engaged with said first guide means for facilitating a relative movement of said table means with respect to said chamber means between a first position closing said open top to said chamber and a second position located along side of said chamber, said table means when in said first position overlapping said food supporting means to permit transportation to distant locations and when in said second position functioning as a support surface to facilitate a distribution of food placed thereon.

2. A mobile broiler apparatus according to claim 1, wherein said first guide means includes a pair of parallel tracks extending in planes perpendicular to the axis of rotation of said wheel means and includes first stop means for limiting movement of said table means in a rearward direction so that said table means will close said chamber means when engaged with said stop means;
   wherein said second guide means includes a pair of parallel guides slidingly mounted on said tracks for sliding movement with respect thereto and therealong in a direction toward and away from said first stop means.

3. A mobile broiler apparatus according to claim 2, including second stop means for limiting the relative movement of said table means away from said first stop means.

4. A mobile broiler apparatus according to claim 2, wherein said chamber means includes at least one horizontal support surface secured to the outside of one of said sidewalls adjacent and parallel to said tracks, said support surface also functioning to prevent inadvertent engagement of personnel with the sidewalls of said chamber means.

5. A mobile broiler apparatus according to claim 4, wherein said horizontal support surface is made of wood.

6. A mobile broiler apparatus according to claim 4, wherein said chamber means is rectangular and said horizontal surface encircles said chamber means on threee sides thereof.

7. A mobile broiler apparatus according to claim 1, wherein said trailer frame means includes bracket means for supporting containers for fuel for said controllable heat generating means.

8. A mobile broiler apparatus according to claim 1, wherein said food supporting means includes a planar surface having means defining an opening therethrough along one edge; wherein said chamber means includes means defining a collection member located below said opening and in alignment therewith for collecting cooking remnants moved through said opening.

9. A mobile broiler apparatus according to claim 8, wherein said collection member comprises a container mounted on slides fastened to the inside sidewalls of said chamber means, said container having handle means accessible from outside said chamber means for facilitating a removal of said container.

10. A mobile broiler apparatus according to claim 8, wherein said food supporting means is fixedly related to said bottom wall of said chamber means.

11. A mobile broiler apparatus according to claim 1, including lighting means and connecting means therefor for connecting said lighting means to a vehicle lighting system.

* * * * *